RECTIFIER CIRCUIT FOR USE IN WIDE RANGE TEMPERATURE ENVIRONMENTS

Filed May 16, 1963

INVENTOR.
HENDRIK A. KLASENS
BY
Frank R. Jufari
AGENT

United States Patent Office 3,278,828

Patented Oct. 11, 1966

3,278,828

RECTIFIER CIRCUIT FOR USE IN WIDE RANGE TEMPERATURE ENVIRONMENTS

Hendrik Anne Klasens, Emmasingel, Eindhoven, Netherlands, assignor to North American Philips Company, Inc., New York, N.Y., a corporation of Delaware Filed May 16, 1963, Ser. No. 280,855
Claims priority, application Netherlands, May 28, 1962, 279,008
7 Claims. (Cl. 321—46)

This invention relates to a rectifier circuit arrangement, and more particularly to a rectifier circuit arrangement utilizing semiconductor rectifiers which are required to operate under conditions of large temperature variations.

Semiconductor devices are known to be extremely sensitive to temperature variations, whether caused by changes in the ambient temperature conditions or by the internal losses in the device itself. In general, the reverse resistance of a semiconductor rectifier will decrease with an increase in temperature. For this reason, semiconductor rectifiers suitable for rectifying operation over a wide temperature range of, for example, from room temperature to 500 degrees centigrade, are generally unavailable. A semiconductor rectifier designed to have an adequately low forward resistance and an adequately high reverse resistance at a particular low temperature, for example, room temperature, will usually not be suitable for use at higher temperatures, since its reverse resistance will then be too low for reliable rectifying operation. On the other hand, a semiconductor rectifier designed to have a sufficiently high reverse resistance at the high temperatures, for example, 500 degrees centigrade, will usually be found to have an excessively high forward resistance at the low temperatures. One solution to this problem has been to use relatively expensive cooling systems to narrow the operating temperature range of the system to limits suitable for the particular semiconductor device being utilized.

It is an object of this invention to provide a semiconductor rectifier circuit arrangement suitable for use over a wide range of temperature variations.

Another object of the invention is to provide a simple and reliable semiconductor circuit arrangement capable of operation over a wide temperature range and which utilizes relatively standard and inexpensive components.

Other objects and advantages of the invention will become apparent as the specification progresses.

In accordance with the invention, the foregoing objects are achieved by a novel circuit arrangement providing plural temperature-responsive current conduction paths by means of which a system is achieved exhibiting a low forward resistance and a high reverse resistance at both low and high temperatures. More particularly, and in a preferred form of the invention, there is provided a circuit arrangement comprising two parallel branches. The first branch includes a first semiconductor rectifier having relatively high forward and reverse resistances at low temperatures, and relatively low and high forward and reverse resistances, respectively, at high temperatures. The second branch includes a second semiconductor rectifier connected in series with a temperature-dependent resistance element. The forward and reverse resistances of the second semiconductor device are relatively low at the high temperatures, but its reverse resistance is relatively high at the low temperatures. At the low temperatures, the resistance of the temperature-dependent resistance element is lower than the forward resistance of the first rectifier and at the high temperatures its resistance is higher than the reverse resistance of the second rectifier. The foregoing circuit arrangement will provide reliable and efficient rectifying operation over a temperature range varying from room temperature to 500 degrees centigrade.

The invention will now be described in greater detail with reference to the following detailed description and the accompanying drawing in which.

Figure 1:
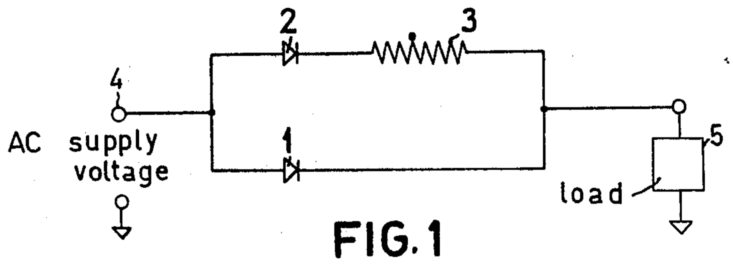
FIG. 1 illustrates a preferred embodiment of the invention.

Referring now to the drawing, the device shown in FIG. 1 comprises a first rectifier 1 made from a material having a sufficiently low forward resistance only at a relatively high temperature. Such a material is, for example, silicon carbide. The forward resistance of this material may drop below 100 ohms when measured at a few tenths of a volt and at 200 degrees centigrade. At room temperature, however, said forward resistance is a few thousand ohms and is much too high for normal operation.

In parallel with the branch including the rectifier 1 there is connected a second branch including the series combination of a rectifier 2 and a resistor 3 having a high positive temperature coefficient of resistance. The rectifier 2 is composed of a material which has an adequately low forward resistance at room temperature. It may be made from silicon or germanium and has a forward resistance, measured at a few tenths of a volt, of only a few ohms at room temperature. The reverse resistance of a rectifier composed of such a material drops below one megohm when measured at 2.5 v. and 300 degrees centigrade. The rectifier 2 alone would therefore be unsuitable for use at the high temperatures. The resistor 3 of high positive temperature coefficient is proportioned so that at the low temperatures it produces only a slight increase in the forward resistance of the branch including the rectifier 2, whereas at the high temperatures the resistance of resistor 3 is substantially higher than the reverse resistance of rectifier 2. The total series resistance of the branch including the rectifier 2 and the resistor 3 is then mainly determined by the resistance value of the resistor 3. The parallel circuit may be placed in series between a source of A.C. voltage applied to terminal 4 and a suitable electric load circuit 5. The circuit shown is suitable for supplying a unidirectional current to the load 5 from an A.C. supply voltage.

The resistor 3 may be manufactured by a method known in the ceramic art from an alkali-titanate substance with Perovskite structure as described in British patent specification 714,965. By means of this method, positive temperature coefficients of more than 20 percent can be obtained. At room temperature the resistance value of the resistor 3 is relatively low, for example, of the order of 15 ohms. Therefore, the forward resistance of the branch including the elements 2 and 3 is only slightly larger than the forward resistance of rectifier 2 alone. However, at 300 degrees centigrade, the resistor 3 has such a high resistance value that it exceeds the reverse resistance of the rectifier 2 so that the branch 2, 3 scarcely contributes to the rectifying process, and for all practical purposes may be considered an open circuit.

Figure 2:
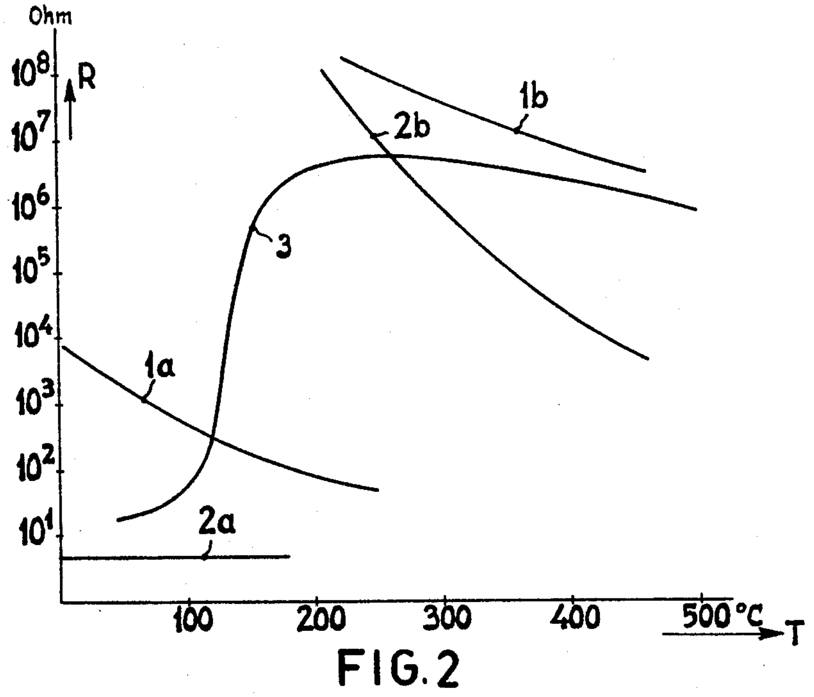
FIG. 2 shows the characteristic curves of temperature versus resistance which are useful in explaining the embodiment of the invention shown in FIG. 1.

In FIGURE 2 the various resistances R are plotted as the ordinate on a logarithmic scale as a function of the temperature, T. The resistance values are plotted for an applied voltage of 2.5 volts. Curve 1*a* indicates the forward resistance of the rectifier 1. From the figure it will be seen that at room temperature this forward resistance is too high for most applications.

The curve 2*a* indicates the forward resistance of the rectifier 2. At room temperature this value is sufficiently low for practical use. The reverse resistance of the rectifier 2 is indicated by the curve 2*b* in FIG. 2. From the figure it will appear that with an increasing temperature the reverse resistance decreases to an unusable value.

The curve 3 indicates the resistance variations with temperature of the resistor 3 which has a high positive temperature coefficient. The curve shown applies to a material composed of barium titanate with a small addition of lanthanum. From the figure it will be apparent that because of the sharply increasing slope of the characteristic curve of resistor 3 above 100 degrees centigrade, the resistance value of the resistor 3 will exceed one megohm at 200 degrees centigrade. Although at temperatures above 200 degrees centigrade the reverse resistance of the rectifier 2 drops to an unusable value for most applications, this is not objectionable for the overall rectifying operation because in the meantime the forward resistance of the rectifier 1 has dropped to an extent such that the branch including said rectifier takes over the rectifying operation. At the high temperature range, the reverse resistance of the rectifier 1 far exceeds the reverse resistance of the rectifier 2 and the resistance value of the resistor 3, respectively, as is indicated in FIG. 2 by the curve 1*b*.

Although the invention has been described with reference to a rectifying circuit arrangement, it will be obvious to one skilled in the art that the present invention has utility in any circuit employing semiconductor devices which must operate reliably over a wide temperature range. Accordingly, it is to be understood that the scope of the invention is not limited to the specific embodiment disclosed, but is limited only to the extent as defined in the appended claims.

What is claimed is:

1. A circuit arrangement adapted for connection between a pair of terminals in a circuit subject to a wide range of temperature variations, said circuit arrangement comprising first and second parallel connected branches, said first branch comprising a first semiconductor rectifier having a relatively high forward and high reverse resistance at a given low temperature within said range of temperatures and a relatively low forward resistance and high reverse resistance at a given high temperature within said range of temperatures, said second branch comprising the series combination of a second semiconductor rectifier and a temperature-dependent resistance element, said second semiconductor rectifier having at said given low temperature a low forward resistance and a high reverse resistance and having at said given high temperature a low forward resistance and a low reverse resistance, and said temperature-dependent resistance element having at said given low temperature a low resistance value and having at said given high temperature a relatively larger resistance value.

2. A circuit arrangement adapted for connection between a pair of terminals in a circuit subject to a wide range of temperature variations, said circuit arrangement comprising first and second parallel connected branches, said first branch comprising a first semiconductor rectifier having a relatively high forward and high reverse resistance at a given low temperature within said range of temperatures and a relatively low forward resistance and high reverse resistance at a given high temperature within said range of temperatures, said second branch comprising the series combination of a second semiconductor rectifier and a temperature-dependent resistance element, said second semiconductor rectifier having at said given low temperature a low forward resistance and a high reverse resistance and having at said given high temperature a low forward resistance and a low reverse resistance, and said temperature-dependent resistance element having at said given low temperature a resistance value which is lower than the forward resistance of said first semiconductor rectifier and having at said given high temperature a resistance value which is higher than the reverse resistance of said second semiconductor rectifier.

3. A circuit arrangement adapted for connection between a pair of terminals in a circuit subject to a wide range of temperature variations, said circuit arrangement comprising first and second parallel connected branches, said first branch comprising a first semiconductor device having a rectifying characteristic, said second branch comprising the series combination of a second semiconductor device having a rectifying characteristic and a temperature-dependent resistance element, said first semiconductor device having at a given temperature a forward resistance and a reverse resistance which is considerably higher than the forward resistance and the reverse resistance, respectively, of said second semiconductor device, said temperature-dependent resistance element having at a given low temperature within said range of temperatures a resistance value which is lower than the forward resistance of said first semiconductor device and a resistance value which is higher than the reverse resistance of said second semiconductor device at a given high temperature within said range of temperatures.

4. A circuit arrangement adapted for connection between a pair of terminals in a circuit subject to a wide range of temperature variations, said circuit arrangement comprising first and second parallel connected branches, said first branch comprising a first semiconductor rectifier device and said second branch comprising the series combination of a second semiconductor rectifier device and a temperature-dependent resistance element, said resistance element having a positive temperature coefficient of resistance within a portion of said range of temperatures, said first semiconductor device having a forward resistance and a reverse resistance which is considerably higher than the forward resistance and the reverse resistance, respectively, of said second semiconductor device at a given temperature, said temperature-dependent resistance element having at a given low temperature within said range of temperatures a low resistance value and having at a given high temperature within said range of temperatures a relatively high resistance value.

5. Apparatus as described in claim 4 wherein said resistance element consists of a material which exhibits a positive temperature coefficient of at least 20 percent.

6. Apparatus as described in claim 4 wherein the resistance value of said temperature-dependent resistance element at said given low temperature is lower than the forward resistance of said first semiconductor device and at said given high temperature the resistance value of said resistance element is higher than the reverse resistance of said second semiconductor device, said first and second semiconductor rectifier devices being poled in the same direction.

7. A rectifying circuit arrangement adapted for use in an environment subject to a wide range of temperature variations comprising, a source of alternating current, an electrical load, circuit means comprising first and second parallel connected branches connected in series with said alternating current source and said load, said first branch comprising a first semiconductor rectifier device, said second branch comprising the series combination of a second semiconductor rectifier device and a temperature-dependent resistance element having a positive temperature coefficient of resistance, said first semiconductor device having a forward resistance and a reverse resistance which is considerably higher than the forward resistance and the reverse resistance, respectively, of said second semiconductor device at a given temperature, said temperature-dependent resistance element having at a given low temperature within said range of temperatures a resistance value which is lower than the forward resistance of said first semiconductor device and a resistance value which is higher than the reverse resistance of said second semiconductor device at a given high temperature within said range of temperatures.

No references cited.

JOHN F. COUCH, *Primary Examiner.*

W. SHOOP, *Assistant Examiner.*